United States Patent [19]

Schmidt

[11] 4,057,771

[45] Nov. 8, 1977

[54] FREQUENCY-RESPONSE CORRECTIVE NETWORK

[75] Inventor: Hans-Joachim Schmidt, Nurnberg, Germany

[73] Assignee: Tekade Felten & Guilleaume Fernmeldeanlagen GmbH, Nurnberg, Germany

[21] Appl. No.: 666,230

[22] Filed: Mar. 12, 1976

[30] Foreign Application Priority Data

Mar. 21, 1975 Germany .............................. 2512459

[51] Int. Cl.² .................. H03H 7/10; H03H 7/16; H04B 3/14
[52] U.S. Cl. ............................. 333/70 R; 333/28 R; 333/75; 333/76; 333/77; 333/81 R
[58] Field of Search .................. 333/70 R, 76, 28 R, 333/28 T, 70 CR, 18, 75, 77, 78, 81 R

[56] References Cited

U.S. PATENT DOCUMENTS

| 2,682,037 | 6/1954 | Bobis et al. | 333/76 X |
| 3,110,004 | 11/1963 | Pope | 334/15 |
| 3,336,539 | 8/1967 | Kwartiroff et al. | 333/18 |

Primary Examiner—Alfred E. Smith
Assistant Examiner—Marvin Nussbaum
Attorney, Agent, or Firm—Michael J. Striker

[57] ABSTRACT

A corrective network for obtaining a desired overall frequency response comprises a plurality of tunable, non-active resonant circuit stages, each connected with a source and operative for modifying the frequency response over a respective portion of the frequency spectrum. Each resonant stage comprises a variable differential capacitor having a rotor plate terminal and two stator plate terminals. Each stage further includes a series circuit branch constituted of a resistor and an inductor which has one end which is connected to the respective rotor terminal of each stage. The network further includes a common terminal at which the other ends of the series circuit branches are all connected. The source may be a transformer having a tap intermediate its end terminals, and an output impedance is located between the common terminal and the tap of the transformer. The stator plate terminals of at least some of the stages are connected to respective ones of the end terminals of the source.

17 Claims, 5 Drawing Figures

FREQUENCY-RESPONSE CORRECTIVE NETWORK

BACKGROUND OF THE INVENTION

The present invention relates to a corrective network and, more particularly, to an equalization circuit arrangement which is employed in transmission systems to obtain a desired overall frequency response.

It is generally known in the prior art to provide corrective networks for improving the frequency-response characteristics of a transmission system. These corrective networks have adjustable components which either increase or decrease the response of a transmission system at a desired frequency or band of frequencies across the overall frequency spectrum. The adjustable components are operative to generate resonances having peak and valleys so as to set the amplitude (gain or loss) and/or the width of the resonances and/or the center frequency at which the resonance occurs. By using any or all of the parameters, it is possible to either boost or suppress respective portions of the frequency-response characteristic.

As noted in German Pat. Nos. 828,258 and 828,718, as well as published German patent application Nos. 1,261,553 and 1,267,261, the prior art corrective networks all share the common disadvantage that they employ a plurality of discrete switching circuits or a potentiometer. The use of multi-stage switching and/or potentiometers, however, has caused many difficulties because switching contact must be repeatedly made.

In an attempt to obviate these aforementioned difficulties, it is also known to provide a device effective for generating a plurality of resonant-like peaks and valleys across the frequency spectrum. However, this prior-art device is possessed of many drawbacks. First of all, this device has a rather large attenuation. Secondly, the signal source must have a very small internal impedance in order that the loading produces no undesirable frequency response. Finally, active amplifying stages are required to be connected to the device in order to offset the rather high loss presented by the device.

SUMMARY OF THE INVENTION

Accordingly, it is the general object of the present invention to overcome the disadvantages of the prior art.

An additional object of the present invention is to provide contact-free adjustable components in order to obtain a desired frequency response.

A further object of the present invention is to provide a corrective network not possessed of high attenuation losses.

Yet a further object of the present invention is to eliminate the need for active stages to offset the high attenuation losses of prior art corrective networks.

Still another object of the present invention is to eliminate the prior-art requirement that the source must be possessed of a very low internal impedance.

In keeping with these objects and others which will become apparent hereinafter, one feature of the invention resides in a corrective network for obtaining a desired overall frequency response which comprises a plurality of tunable, non-active resonant circuit stages, each connected with a source and operative for modifying the frequency response over a respective portion of the frequency spectrum.

In accordance with the invention, each resonant circuit stage comprises a variable capacitor, such as a differential capacitor having two similar sets of stator plates and one set of rotor plates. When the rotor is turned, the capacitance of one section is increased, while the capacitance of the other section is decreased. Alternatively, a non-moving type of voltage-controlled or voltage-variable capacitor, i.e. a set of varactor diodes, can be employed to vary the capacitance with applied voltage.

By using such variable capacitors, the corrective network, in accordance with the invention, offers contactfree tuning and a very minimal attenuation characteristic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
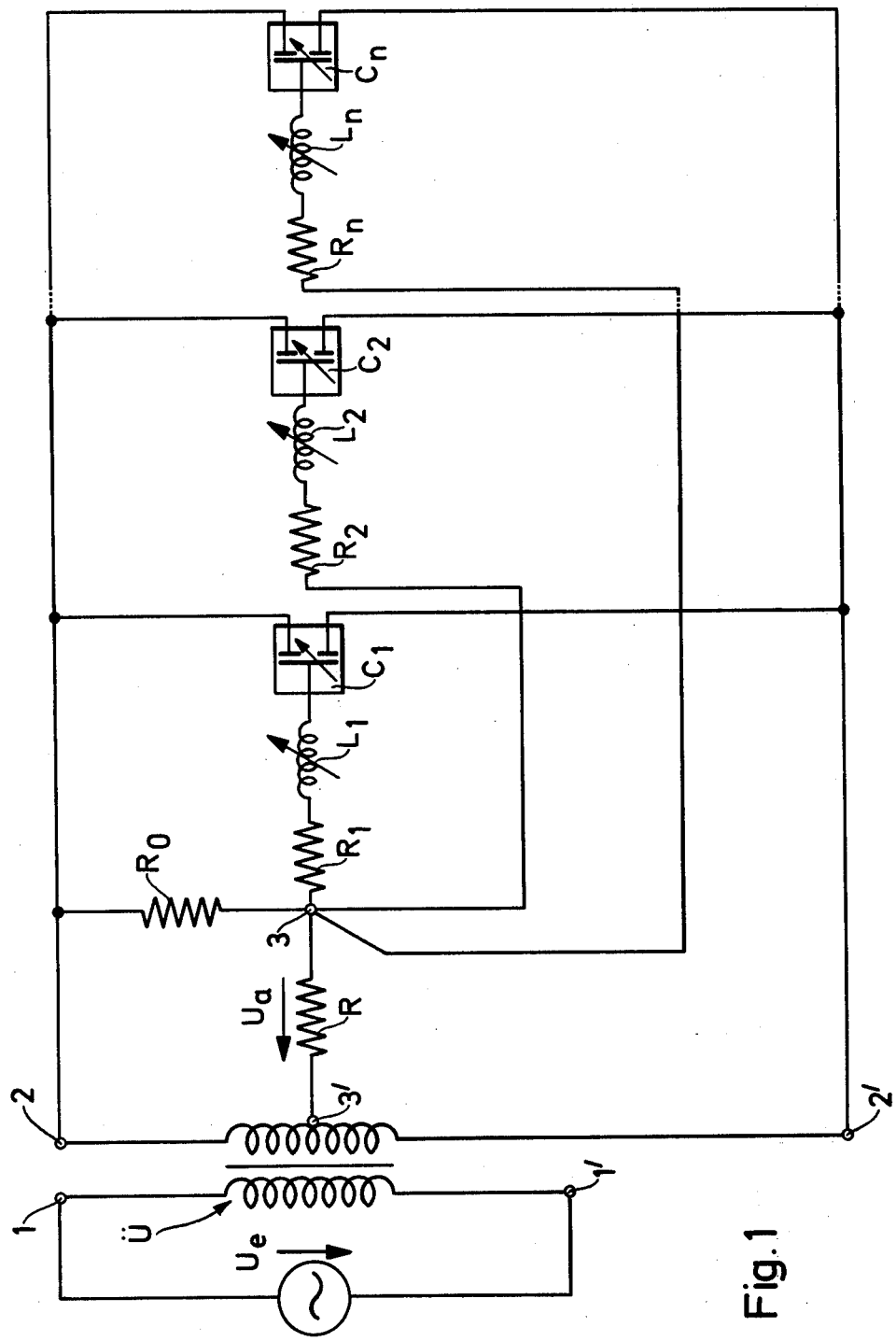
FIG. 1 illustrates a diagrammatic view of an embodiment of a corrective network in accordance with the present invention.

Turning firstly to FIG. 1 of the drawing, a simplified version of a corrective network according to the present invention is shown to be comprised of a plurality of tunable, non-active resonant circuit stages which are each connected with a source. The function of these stages is to modify the frequency response over a respective portion of the frequency spectrum in order to obtain a desired overall frequency-response characteristic.

In order to facilitate the discussion, the stages are sequentially numbered from parameter $x = 1$ to parameter $x = n$; and every component of any particular stage (e.g. $x$) is identified by the same parameter $x$. The number of stages depends, of course, upon the application, that is how many resonant peaks and valleys are to be generated.

In FIG. 1, the input signal $U_e$ is conveyed to input terminals 1, 1' across which the primary winding of symmetrical transformer U is connected. All of the resonant circuit stages are connected to the two output end terminals 2, 2' of the secondary winding.

Each stage comprises a variable capacitor, such as a differential capacitor $C_x(C_1, C_2, C_x \ldots C_n)$. Variable capacitor $C_x$ has two symmetrical sets of stator plates having two output terminals and one set of rotor plates having an input terminal. When the rotor is turned, the capacitance at one stator output terminal increases, while the capacitance at the other stator output terminal decreases. The two stator plate terminals of each stage are connected to respective ones of the end terminals 2, 2' of the secondary winding.

In addition, each stage comprises a resistor $R_x(R_1, R_2, R_x \ldots R_n)$ and an inductor $L_x(L_1, L_2, L_x \ldots L_n)$ which are connected in series with each other and are connected between the rotor plate terminal and a common terminal 3. The secondary winding has a tap 3' which is preferably centrally located between end terminals 2, 2'. An output impedance R has one end connected to center tap 3', and its other end connected to common terminal 3. A voltage-dropping resistor $R_o$ is connected between end terminal 2 of the source and common terminal 3.

In operation, with the rotor of each differential capacitor $C_x$ is placed in the middle position so that the partial capacitance at one stator output terminal corresponds to the partial capacitance at the other stator output terminal, then the voltage difference between terminals 3 and 3' is substantially zero. Voltage-dropping resistor $R_o$ is selected to permit some electrical current to flow from the source through output impedance R so as to generate an output voltage signal $U_a$ when the rotor of differential capacitor is in its middle position.

When the rotor of a stage is moved in either direction away from the middle position, additional electrical current begins to flow through the output impedance R. The value of this additional electrical current reaches its maximum when the mid frequency $w_o$ of the generated resonance is determined by the relationship $$w_o = \frac{1}{\sqrt{L_x \cdot C_x}}$$

The output signal $U_a$, which is tapped off of output impedance R, can thus modify the frequency response in dependence upon the position of a particular rotor or rotors. If the impedance R is selected to be relatively smaller than the voltage-dropping resistor $R_o$, as well as the resistance $R_x$, then it is possible to realize n different resonant peaks or valleys, each resonance being decoupled from the other. The maximum value of a peak or valley obtained by fully displacing the rotor of a stage is determined by voltage division and equals the ratio $R_o/R_x$, a value which can be selected at will depending on the application.

Thereby, the amplitude or height of the individual resonant peaks and valleys can be adjusted by the differential capacitors. The width of these peaks or valleys are determined by the size chosen for the resistor $R_x$. The respective portion of the frequency spectrum, i.e. the frequency at which the resonance occurs, is determined by the capacitance $C_x$ and the inductance $L_x$. Of course, the resonant frequency and the width of the resonances remains substantially constant when the differential capacitor is adjusted. If it is desired to change the resonant frequency, means for adjusting the inductance of the inductor $L_x$ can be employed.

In many applications, the attenuation of the corrective network is compensated by a subsequent amplifier stage. A small input resistance for this amplifier can be realized by utilizing the output impedance R as the input resistance of the amplifier, or by employing a conventional parallel feedback circuit. In this case, the decoupling of the resonant circuit stages with the amplifier is especially good.

Figure 2:
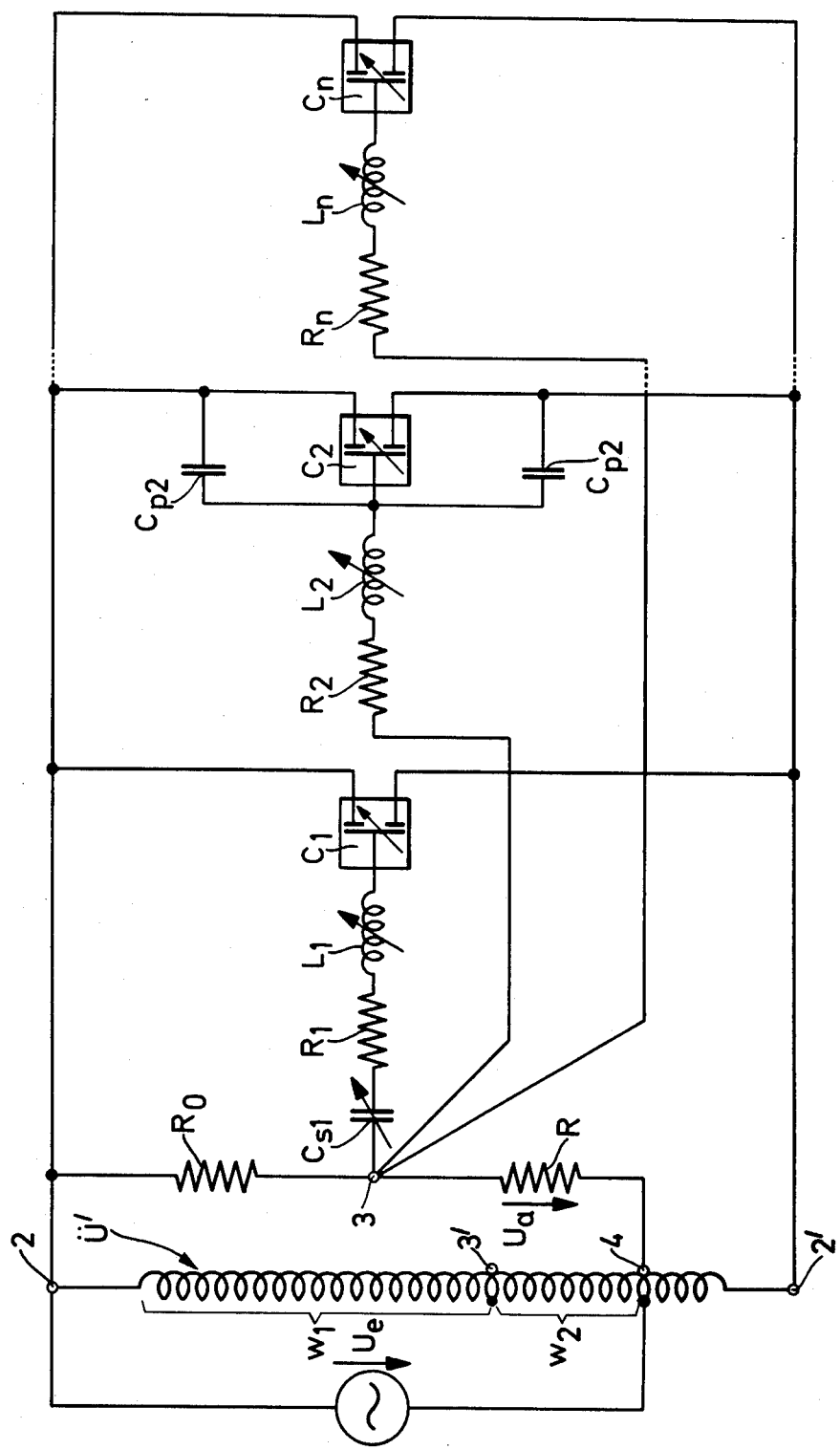
FIG. 2 illustrates a diagrammatic view of another embodiment of a corrective network in accordance with the present invention.

Turning next to FIG. 2, it will be noted that like reference numerals identifiy similar parts which were previously discussed in connection with FIG. 1. In the FIG. 2 embodiment, the input signal $U_e$ is conducted to an autotransformer U which has a center tap 3' spaced from the tap 4. Furthermore, the previously-disclosed limiting requirement that the impedance R is to be relatively smaller than dropping resistor $R_o$ and resistor $R_x$ need no longer be observed if the output impedance R has one end connected with common terminal 3 and its other end connected with tap 4. The tap 4 is located on the autotransformer so that the ratio of the number of windings ($w_1$) located between end terminal 2 and center tap 3' relative to the number of windings ($w_2$) between center tap 3' and tap 4 is substantially equal to the ratio of the value of the dropping resistor $R_o$ relative to the impedance $R(w_1/w_2 = R_o/R)$.

In operation, when the rotor is positioned in the middle position of the differential capacitor, no voltage drop occurs across terminals 3, 3', although a frequency-independent output signal $U_a$ can be taken off of output impedance R. In other words, in the middle position, no current flows from terminal 3 towards the resonant circuit stages and, accordingly, undesired ripples in the frequency-response characteristic are prevented from appearing in the output voltage signal.

The input signal source can theoretically be connected to any location on the winding of the autotransformer. However, it is advantageous if the input signal source is connected across terminal 2 and tap 4 so that input and output voltage signals have a common ground potential.

For many applications, the size of the capacitance $C_x$ which is available in commercial differential capacitors is too large. Thus, for example, if it is desired to lower the capacitance of the first stage, a variable or fixed value compensating capacitor $C_{s1}$ is connected in series with the resistor $R_1$ and the inductor $L_1$ between the rotor plate terminal and the common terminal 3. The variable compensating capacitor $C_{s1}$ is operative for adjusting the resonant frequency and the width of the resonances. Furthermore, if the inductance of inductor $L_1$ were not variable but fixed, the use of a variable compensating capacitor would be primarily responsible for adjusting the resonant frequency.

In addition, two similar fixed or variable compensating capacitors can be symmetrically connected between a respective one of the stator plate terminals and the rotor plate terminal. For example, in stage 2, compensating capacitors $C_{p2}$ are used to compensate for the capacitance commercially available with differential capacitors. The decreased height of the resonant peaks or valleys can be offset by a corresponding change in the value of the resistor $R_2$.

Figure 3:
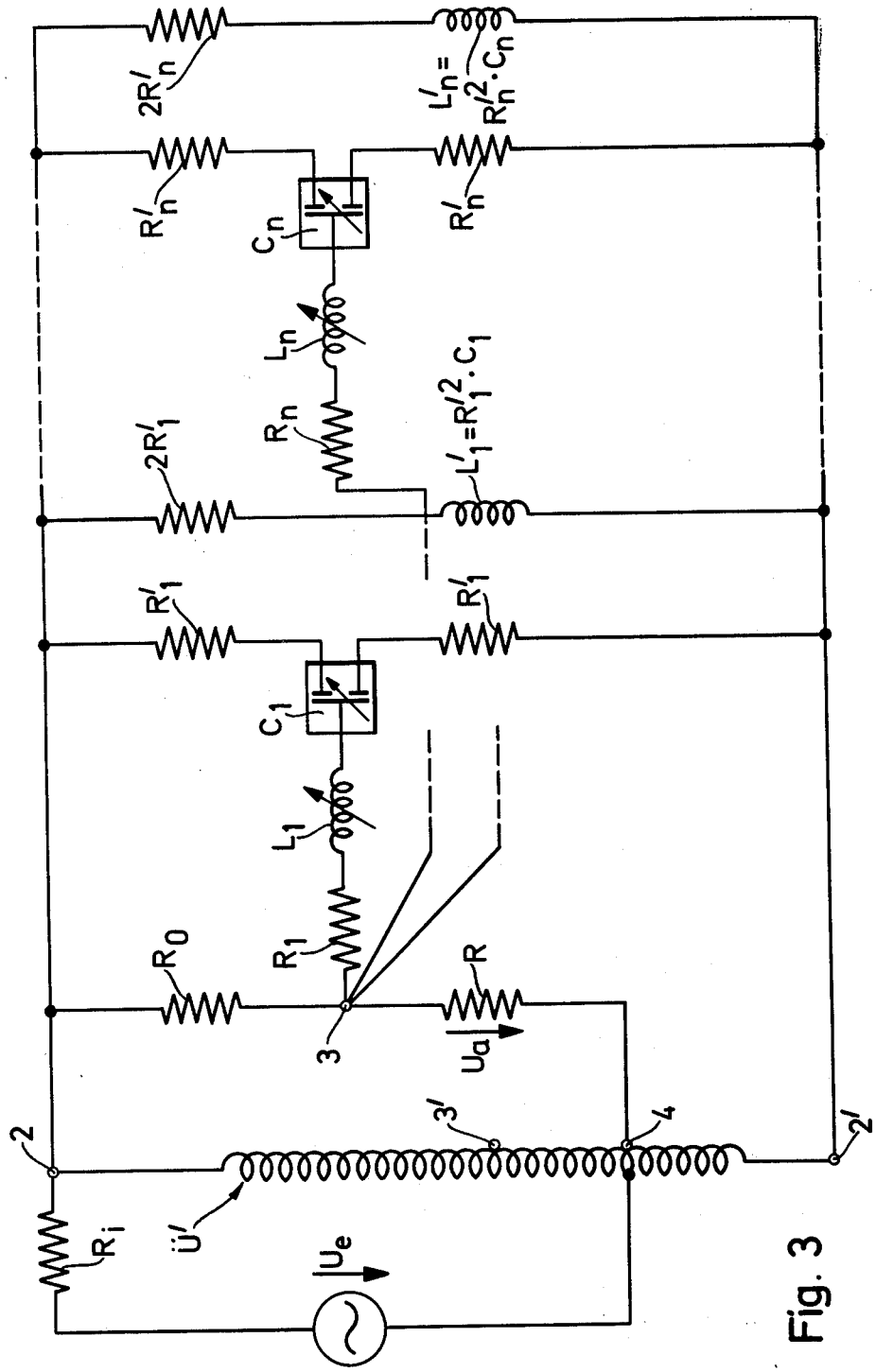
FIG. 3 illustrates a modification of the embodiment of FIG. 2.

FIG. 3 is analogous to FIGS. 1 and 2 and employs similar reference numerals. Two substantially equal correcting resistors $R_x'$ ($R_1'$, $R_x' \ldots R_n'$) are each connected between a respective stator plate terminal and end terminals 2 or 2'. As noted above no current flows out of the rotor plate terminal when the latter is positioned in the middle position of the differential capacitor. Moreover, this branch portion of the network has an equivalent impedance equal to $2R_x' + C_x/4$. This relationship is calculated on common electrical circuit principles. It should be kept in mind that the total capacitance $C_x$ of the differential capacitor equals the sum of the partial capacitances $C_{x1}, C_{x2}$ attributed to each section. In the middle position, $C_{x1} = C_{x2} = C_x/2$; and the series addition of these capacitances amounts to $C_x/4$. Of course, the two correcting resistors add up to $2R_x'$.

In order to compensate for the impedance of this aforementioned branch, a compensating impedance is connected in a parallel branch across the end terminals 2, 2' of the source and is constituted of a compensating resistor having a value equal to twice that of a correcting resistor $R_x'$ and a compensating inductor $L_x'$ having an equivalent impedance equal to the correcting resistor $R_x'2$ multiplied by the capacitor $C_x$ of the differential capacitor. The equivalent impedance of both branches amounts to the real value $2.R_x'$. If both correcting and compensating branches were added for each stage, then the total loading of n resonant circuit stages in the middle position of the differential capacitor would be all resistive and have the value $2R_x'/n$, provided that all correcting resistors $R_x'$ are all of equal value. If the correcting resistors of separate stages have different values, then the total loading would be determined from the known relationship between parallel connected impedances.

By properly dimensioning the correcting resistor $R_x'$, it is possible to simply set the input impedance of the corrective network to a predetermined value. Of course, the additional loading presented by the resistors $R_o$ and R must be taken into account.

Since the customary maximum amplitude of the input signal rarely exceeds 30% of nominal and since during operation not all of the stages need be tuned, the input impedance of the corrective network remains mostly real and does not vary significantly from the value obtained when the rotor of the differential capacitor is in its middle position.

In the FIG. 3 embodiment, the internal resistance $R_i$ of the input source $U_e$ need not be especially small since the input impedance of the corrective network can be matched to the internal resistance $R_i$, no matter how long the connection is between the source $U_e$ and the corrective network.

The use of the correcting resistor $R_x'$ is not trivial. The use of these correcting resistors results in the rather surprising result that they do not effect the capacitance which is effective in the generation of the resonances, even if the rotor of the differential capacitor is adjusted to a random position. The original concept of varying the capacitor and changing only the height of the peaks or valleys without simultaneously changing the width of the frequency position of the resonances remains the same. It is only for very wide resonances that the width and/or frequency position will change due to the presence of the correcting resistors. However, such very wide resonances do not occur in practical circuits.

In practically-designed corrective networks, not all of the stages need be provided with the above-defined double-branch circuits. For example, if one of the stages has a differential capacitor having a very small capacitance, this slightly capacitive nature of this stage need not be corrected, and the double-branch circuit can be omitted. Furthermore, if the value of the capacitance $C_x$ and the value of the correcting resistor $R_x'$ are selected so that at least some of the stages have the same time constant, then all of these stages can be simultaneously compensated by a single branch comprised only of a single compensating resistor $2R_x'$ and a compensating inductor $L_x'$.

Figure 4:
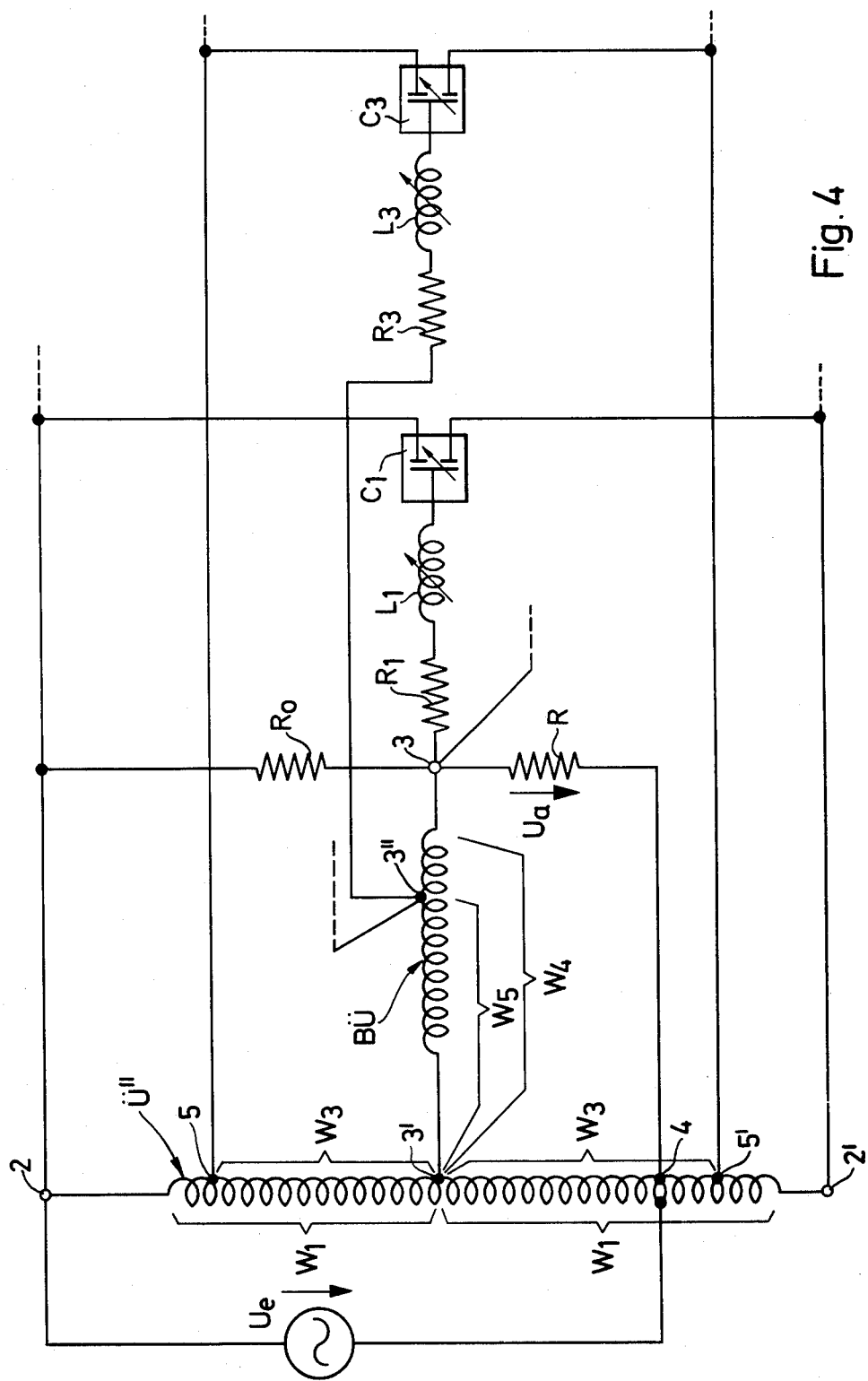
FIG. 4 illustrates an additional modification of the embodiment of FIG. 2.

It is also common in practical corrective networks to employ occasional capacitance values which are not generally realizable with commercially available differential capacitors. To meet this situation, the embodiment of FIG. 4 illustrates an autotransformer having symmetrical intermediate terminals 5, 5', each respectively located between the center terminal 3' and a respective one of the end terminals 2, 2'. The stator plate terminals of the stage in question (in this case, stage 3) is then connected across intermediate terminals 5, 5'. Thus, matching to the desired capacitive value is realized by voltage step-down conversion. Similarly, voltage step-up conversion can be employed.

An additional transformer BU having tap point 3" is connected between the center terminal 3' and the common terminal 3. The resistor $R_3$ and inductor $L_3$ of the stage in question is then connected between the rotor terminal and the tap point 3". The tap point 3" is located on the additional transformer BU so that the ratio of the number of windings ($w_1$) between end terminal 2 and the center terminal 3' relative to the number of windings ($w_3$) between the center terminal 3' and an intermediate terminal 5 is substantially equal to the ratio between the total number of windings ($w_4$) of the additional transformer between the common terminal 3 and center terminal 3' relative to the number of windings ($w_5$) between the tap point 3" and the center tap 3' ($w_1/w_3 = w_4/w_5$).

Figure 5:
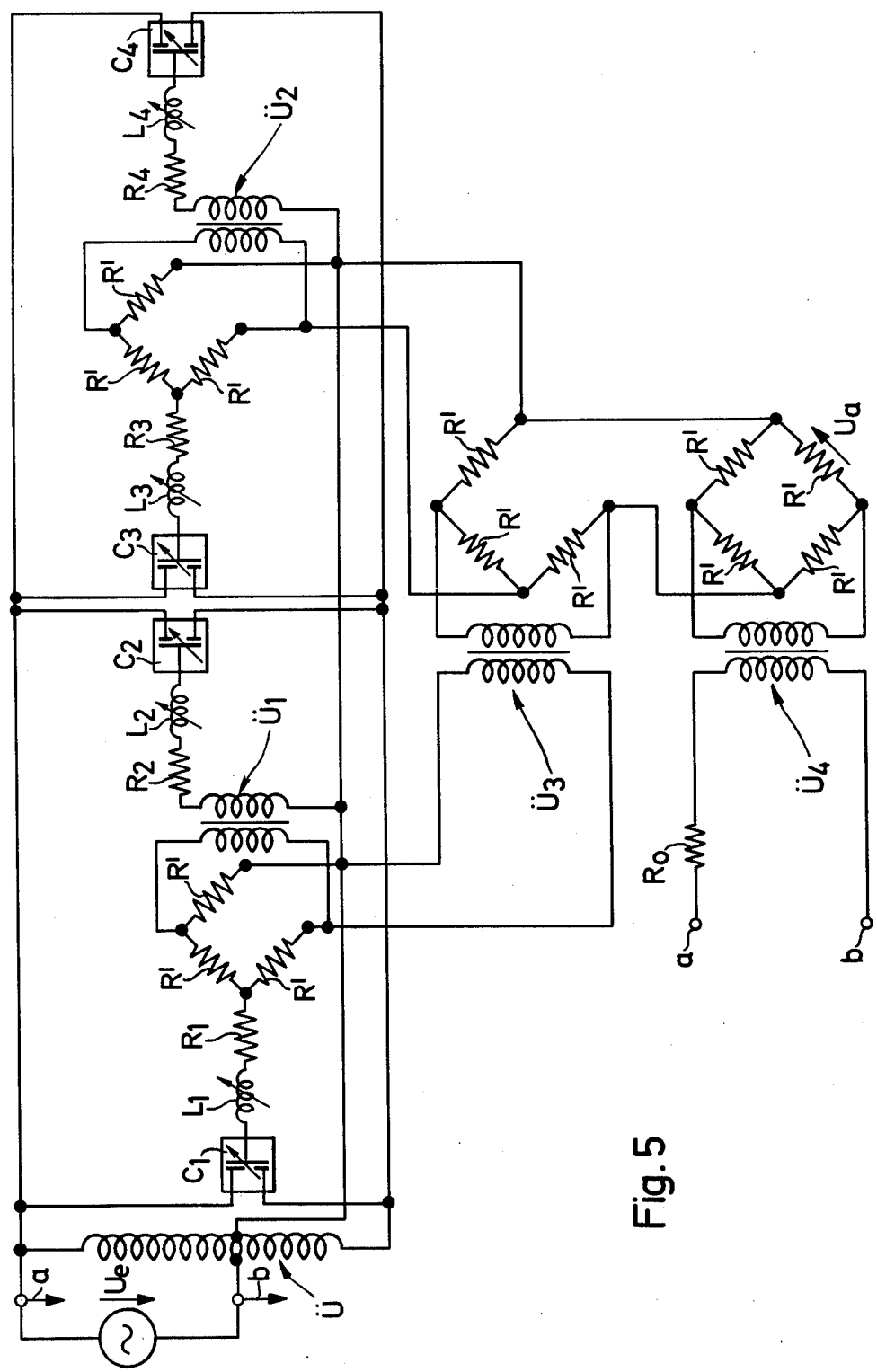
FIG. 5 illustrates still another embodiment of a corrective network in accordance with the present invention.

In the above-described embodiments, the currents which flow out of the rotor terminals of the respective stages are only well decoupled from each other if the impedance between the terminals 3 and 3', which is shared by all of the stages and which has the value corresponding to the parallel addition of output resistor R and the dropping resistor $R_o$, is relatively smaller with respect to $R_x$. In many cases, this requirement is easily met if there are many stages. However, inadequate decoupling between the stages results in ripples throughout the frequency-response characteristic in the output voltage signal. In order to substantially reduce the size and thereby to eliminate these undesired ripples, the embodiment of FIG. 5 illustrates various decoupling means.

The resonant circuit stages are arranged in pairs; that is, the currents issuing from the rotor plate terminals of stages 1 and 2 are conveyed to a first decoupling means $U_1$ which is comprised of a transformer $U_1$ and a bridge circuit having resistors R'. A second decoupling means $U_2$ is arranged between stages 3 and 4. The various stages of each pair are thus highly decoupled from each other.

Additional decoupling means $U_3$ is connected between the aforementioned pairs of stages. Thus, the first portion of the output signal obtained by the added parts of stages 1 and 2 and the second portion of the output signal obtained by the added parts of stages 3 and 4 are decoupled from each other in the additional decoupling means $U_3$ so as to form a frequency-independent output signal.

Finally, supplementary decoupling means $U_4$ are connected between source terminals a, b and all the resonant circuit stages. This completes the decoupling and assures that undesirable ripples are effectively eliminated.

Of course, the above-described decoupling means can be repeated for additional pairs and is not to be limited to the four-stage network shown in FIG. 5. Instead of the resistive bridge circuits, other transformers can be substituted in their place. In this case, the attenuation characterized of the network is much smaller; however, the number of transformers needed is corresponding larger.

The tunable components described above, for example the differential capacitor $C_x$, the compensating capacitor $C_{sx}$ and the variable inductor $L_x$, can be used in semi-automatic or automatic control systems and can be manually-or electronically-actuated. For example, the inductance of inductor $L_x$ can be changed by a control current which effects the magnetic coupling in the inductor core. Furthermore, the capacitance of compensating capacitor $C_{sx}$ can be changed by a control voltage which biases a varactor diode. Similarly, by correspondingly dimensioning a control voltage, one can simulate the function of the differential capacitor with a pair of voltage-controlled capacitors or varactor-type diodes.

In accordance with the invention, the corrective network offers contact-free tuning and a very minimal attenuation characteristic. It is further advantageous if the tuning is programmed; in such cases, one can realize the variable components $C_x$, $L_x$ and $C_{sx}$ as a plurality of switch-type fixed-value capacitors or inductors.

It will be understood that each of the elements described above, or two or more together, may also find a useful application in other types of constructions differing from the types described above.

While the invention has been illustrated and described as embodied in a frequency-response corrective network, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A corrective equalizer network for obtaining a desired attenuation versus frequency characteristic, comprising a source having output terminals; a plurality of non-active stages each having an input connected across the output terminals of the source for receiving input signals from the latter, an output for supplying output signals to a load, and adjustable reactance elements intermediate the respective input and output of every stage; means for tuning at least one of the adjustable reactance elements of each stage so as to set every stage to be resonant at different frequencies of the frequency spectrum of the input signals; and means for adjusting at least one of the adjustable reactance elements of each stage independently from other adjustable reactance elements of every other stage so as to selectively vary the amplitude of at least a selected one of the respective frequencies of the spectrum for altering the level of attenuation at said selected one frequency, whereby the output signals supplied to the load have the desired attenuation versus frequency characteristic for the entire frequency spectrum.

2. A network as defined in claim 1, wherein the source is a symmetrical source having a tap located intermediate the output terminals; and further comprising an impedance having one terminal connected to the tap and having another terminal, and a dropping resistor connected between the other terminal of said impedance and one of the output terminals of the source; and wherein each stage comprises a differential capacitor having a rotor plate terminal and two stator plate terminals, said stator plate terminals of at least one of the stages being connected to respective ones of the output terminals of said source; and wherein each stage further comprises a resistor and an inductor connected between the rotor plate terminal and the other terminal of said impedance.

3. A network as defined in claim 1, wherein each stage comprises a variable capacitor and a variable inductor connected in series with the capacitor.

4. A network as defined in claim 1, wherein one and another of said stages constitutes one pair of stages, and wherein at least another and at least still another of said stages constitute at least another pair of stages; and further comprising means for decoupling the output signals of said stages from each other, said decoupling means including a pair of resistors operatively connected in series between the output of a stage of one of said pairs and one side of the load, said pair of resistors having a junction therebetween, another resistor operatively connected in series between the output of said stage of said one pair and the other side of the load, said other resistor and said load having a junction therebetween, and a transformer having one winding connected across said junctions, and another mutually coupled winding operatively connected between the output of the other stage of said one pair and the source.

5. A corrective network for obtaining a desired overall frequency response, comprising a symmetrical source having two output terminals and a tap located intermediate the output terminals; a dropping resistor having one end connected to one of the output terminals of the source, and another end; a load impedance connected between the other end of the dropping resistor and the tap; and a plurality of tunable, non-active resonant circuit stages each including a differential capacitor having two stator plate terminals each connected to a respective one of the output terminals of the source for receiving input signals from the latter, and a rotor plate terminal, each stage also including a resistor and an inductor operatively connected between the rotor plate terminal and the other end of the dropping resistor, each differential capacitor of every stage being adjustable for supplying output signals to the load impedance such that respective different portions of the frequency spectrum of the input signals are modified to obtain the desired overall frequency response.

6. A network as defined in claim 5, wherein the source comprises a transformer having a secondary winding connected between the output terminals of the source, and wherein said tap is a center tap.

7. A network as defined in claim 5; and further comprising means for adjusting the inductance of the inductor.

8. A network as defined in claim 5, wherein the impedance constitutes the internal resistance of an amplifier.

9. A network as defined in claim 5, wherein the source comprises an autotransformer having a center terminal spaced from said tap, and also having a winding connected between said one output terminal of the source and said tap, said tap being located on the winding so that the ratio of the number of windings between said one output terminal of the source and said center terminal relative to the number of windings between the latter and said tap is substantially equal to the ratio of the value of the dropping resistor relataive to the impedance.

10. A network as defined in claim 5, and wherein at least one of the stages further comprises a variable compensating capacitor connected in series with said resistor and said inductor between the rotor plate terminal and the impedance.

11. A network as defined in claim 5, and wherein at least one of the stages further comprises two similar compensating capacitors, each symmetrically connected between a respective one of the stator plate terminals and the rotor plate terminal.

12. A network as defined in claim 5, and wherein at least one of the stages further comprises two similar correcting resistors, each symmetrically connected between a respective one of the stator plate terminals and a respective one of the output terminals of the source; and further comprising a compensating impedance connected across the output terminals of the source and constituted of a compensating resistance having a value about two times that of a correcting resistor and further constituted of a compensating inductor having an equivalent impedance about equal to that of the differential capacitor multiplied by the correcting resistor squared.

13. A network as defined in claim 12, wherein all of the stages are comprised of said correcting resistors and said compensating impedance.

14. A network as defined in claim 12, wherein a group of the plurality of stages is characterized in that the time constants obtained by multiplying the resistive value of a respective correcting resistor by the capacitor value of a respective differential capacitor are about equal, and wherein all members of the group share a single common compensating impedance.

15. A network as defined in claim 5, wherein the source comprises an autotransformer having a center terminal spaced from said tap, and a pair of intermediate terminals each located between the center terminal and a respective one of the two output terminals; and wherein the stator plate terminals of at least another of the stages are connected to respective ones of the intermediate terminals.

16. A network as defined in claim 15; and further comprising an additional transformer having a tap point and being connected between the center terminal of the autotransformer and the other end of the dropping resistor, said resistor and inductor of said other stage being connected between the rotor plate terminal and the tap point of the additional transformer, said tap point being located on the additional transformer so that the ratio of the number of windings between a respective one of the output terminals of the source and the center terminal relative to the number of windings between the latter and a respective one of the intermediate terminals is substantially equal to the ratio between the total number of windings of the additional transformer relative to the number of windings between the tap point and the center terminal.

17. A corrective network for obtaining a desired overall frequency response, comprising a source having two output terminals and a tap located intermediate the output terminals; and a plurality of tunable, non-active resonant circuit stages each including a differential capacitor having two stator plate terminals each connected to a respective one of the output terminals of the source for receiving input signals from the latter, and a rotor plate terminal, each stage also including a resistor and an inductor operatively connected between the rotor plate terminal and the source, each differential capacitor of every stage being adjustable so as to generate output signals such that respective different portions of the frequency spectrum are modified.

* * * * *